July 22, 1958    W. T. DONAHOO    2,843,949
ANIMATED DISPLAY DEVICE
Filed May 13, 1955
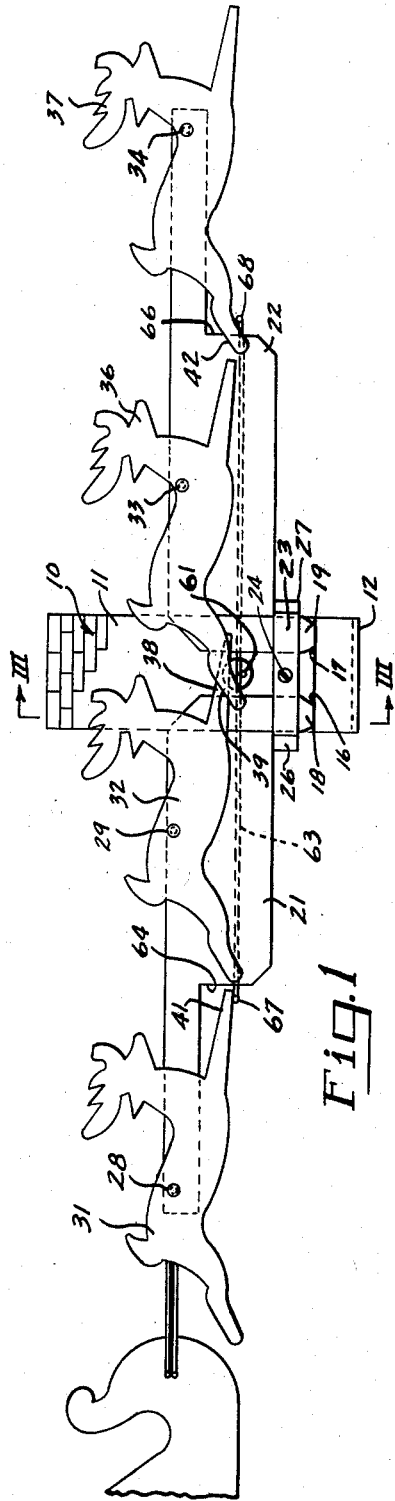
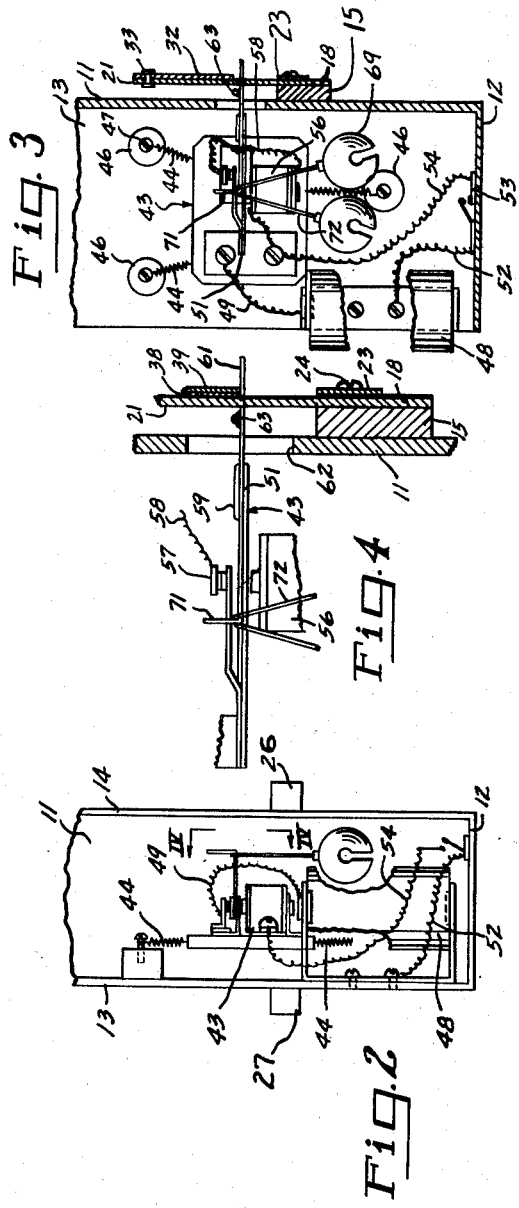
INVENTOR.
WILLIAM T. DONAHOO
BY
ATTORNEYS

United States Patent Office 2,843,949
Patented July 22, 1958

2,843,949

ANIMATED DISPLAY DEVICE

William T. Donahoo, Gadsden, Ala.

Application May 13, 1955, Serial No. 508,191

5 Claims. (Cl. 40—28.1)

This invention relates to a display device having a plurality of figures representing animals, the motions of which simulate life-like movement of the animals.

One object of my invention is to provide an animated display device having a plurality of animal figures mounted for independent pivotal movement whereby the movement of the figures are not dependent upon or in time with each other.

A further object of my invention is to provide an animated display device which shall embody animal figures mounted in tandem for individual pivotal movements which are not constant in degree or range, thereby simulating the running of animals, such as deer or the like.

A still further object of my invention is to provide a display device of the character designated which shall be simple of construction, economical of manufacture and one which is adapted for use as a toy or as a display, such as a Christmas decoration.

Briefly, my display device comprises animal figures mounted for pivotal movement on a support member with one end of each figure overbalancing the other thereof. A vibratory member is mounted beneath the overbalanced ends of the figures in position to engage the same as they move downward whereby substantially continuous oscillatory motion is imparted to the figures.

A device embodying features of my invention is shown in the accompanying drawing forming a part of this application, in which:

Fig. 1 is a front elevational view of the device;

Fig. 2 is an enlarged rear elevational view, partly broken away for the sake of clarity;

Fig. 3 is an enlarged view taken generally along the line III—III of Fig. 1; and Fig. 4 is an enlarged fragmental view taken generally along the line IV—IV of Fig. 2, parts being omitted for the sake of clarity.

Referring now to the drawing for a better understanding of my invention, I show a housing 10 which may simulate the chimney of a house. The housing 10 has a front wall 11, a bottom wall 12 and side walls 13 and 14.

Mounted on the front wall 11 outwardly of the housing 10, is a block member 15 having reduced portions 16 and 17 in the forward side thereof adjacent each end of the block for receiving the inner ends 18 and 19 of oppositely disposed support members 21 and 22, respectively. As shown in Fig. 1, the inner ends 18 and 19 of the support members extend downwardly and are of a width equal substantially the width of the reduced portions 16 and 17. Mounted on the block member 15 and spanning the reduced portions 16 and 17 is a horizontal spring clip member 23. The clip member 23 is secured to the block and the front wall 11 by means of a suitable screw 24. The ends 26 and 27 of the clip member extend outwardly of the housing 10 whereby they may be pressed outwardly to facilitate the insertion of the inner ends 18 and 19 of the support members.

Pivotally connected to the support member 21 by means of pivot pins 28 and 29 are animal figures 31 and 32, respectively, which represent reindeer. In like manner pivotally mounted on the support member 22 by means of pivot pins 33 and 34 are animal figures 36 and 37, respectively, which also represent reindeer. The inner or adjacent ends 38 and 39 of the figures 32 and 36 overlap each other and overbalance the other ends of these figures whereby the ends 38 and 39 move downwardly by gravity after the same have been raised. The rear end of the figure 31 is mounted on its pivot pin 28 whereby its forward end 41 overbalances its rear end and falls by gravity when moved to raised position. In similar manner, the rear end 42 of the figure 37 overbalances the forward end thereof whereby the rear end moves downward by gravity when the same is raised.

Mounted within the housing 10 is an electro-magnetic vibratory unit 43 which may be of the conventional type employed in electro-magnetic buzzers and bells. The electro-magnetic unit 43 is mounted on the side wall 13 of the housing 10 by means of springs 44 which are attached at one end to the unit 43 and at the other ends thereof to resilient cushion members 46, such as blocks of felt or the like. The springs 44 are secured to the cushion members 46 by any suitable means such as by screws 47.

Power for the electro-magnetic unit 43 is supplied by a battery 48 which is connected by a line 49 to the vibratory element 51 of the unit 43. The other side of the battery 48 is connected by a line 52 to a switch element 53 which in turn is connected by a line 54 to the coil of the unit 43 indicated at 56. The coil 56 is connected to a contact point 57 of the electro-magnetic unit 43 by a line 58 whereby when the switch element 53 is closed the element 51 vibrates in a vertical direction.

Mounted on the vibrating element 51 by any suitable means, such as by soldering at 59 is a vibrating member 61. An opening 62 is provided in the front wall 11 and is of a size to permit free vibration of the member 61. The outer end of the vibrating member 61 extends beneath the overlapped ends 38 and 39 of the figures 32 and 36, as shown in Fig. 1 whereby it is in position to engage the ends 38 and 39 as they move downwardly by gravity, thus causing substantially continuous oscillation of the figures 32 and 36 about their pivot points.

Rigidly secured to the vibrating member 61 intermediate the front wall 11 and the support members 21 and 22 is an elongated vibrating member 63 which extends alongside and substantially parallel to the support members. As shown in Fig. 1 the lower portions of the support members 21 and 22 are cut away as at 64 and 66 adjacent the ends thereof for receiving laterally and forwardly extending projections 67 and 68, respectively, at the outer ends of the elongated vibrating member 63. The forwardly extending projection 67 extends beneath the forward end 41 of the figure 31 whereby it forces that end of the figure upwardly as it falls by gravity, thus imparting continuous oscillatory motion to the figure 31. In a similar manner the forwardly projecting member 68 extends beneath the rear end 42 of the figure 37 and forces the same upwardly as it falls by gravity thus imparting substantially continuous oscillatory motion to the figure 37.

The animated figures 31, 32, 36 and 37 may be associated with the representation of a sleigh, thereby simulating Santa Claus and his reindeer. Also, to make the device more life-like, I mount bells 69 on the vibrating element 51. Preferably, I bend the inner end of the vibrating member 61 upwardly as at 71 and attach the bells 69 thereto by a wire member 72.

From the foregoing, it will be apparent that I have devised an improved animated display device which is adapted for use both as a toy and as a display article, such as a Christmas decoration. By providing animal figures mounted for individual pivotal movement on a support member with one end of each figure overbalancing the other end thereof, together with a vibratory member mounted beneath the overbalanced ends, the overbalanced ends of the figures are continuously forced upwardly as they fall by gravity. Also, the oscillatory motion of the figures is irregular due to the fact that the overbalanced ends of the figures contact the vibrating members at different points in the oscillation thereof. That is to say, the overbalanced ends of the figures might contact the vibrating members as they are moving downwardly, upwardly or while changing in direction of movement. It will thus be seen that the movement of the individual figures is not dependent upon or in time with each other and the degree of movement of the individual figures is not constant, thereby simulating the running of animals.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In an animated display device, a fixed non-rotatable support member, a pair of aligned animal figures mounted in tandem for individual pivotal movement on said fixed support member with the adjacent ends of said figures overlapping each other and overbalancing the other ends thereof, and a vertically vibrating member mounted beneath the overlapped ends of said figures in position to support said overlapped ends and engage the same as they move downward, whereby substantially continuous oscillatory motion is imparted to said figures upon vibration of said vibrating member.

2. In an animated display device, a support member, a plurality of animal figures mounted in tandem for individual pivotal movement on said support member with one end of each figure overbalancing the other end thereof, an elongated vertically vibrating member mounted alongside said figures, and laterally projecting arms on said vibrating member disposed beneath the overbalanced ends of said figures in position to support said overbalanced ends and engage the same as they move downward whereby substantially continuous oscillatory motion is imparted to said figures upon vibration of said vibrating member.

3. In an animated display device, a housing, an elongated horizontally extending support member mounted on said housing, a plurality of animal figures mounted in tandem for individual pivotal movement on said support member with one end of each figure overbalancing the other end thereof, a vertically vibrating member mounted within said housing, an arm secured to said vibrating member and extending alongside said support member, and laterally extending projections on said arm disposed beneath the overbalanced ends of said figures in position to support said overbalanced ends and engage the same as they move downward whereby substantially continuous oscillatory motion is imparted to said figures upon vibration of said vibrating member.

4. An animated display device as defined in claim 3 in which the support member comprises oppositely disposed sections mounted detachably on said housing.

5. An animated display device as defined in claim 2 in which a bell is operatively connected to the vibrating member to simulate the running of animal figures carrying bells.

References Cited in the file of this patent

UNITED STATES PATENTS

| Number | Name | Date |
|---|---|---|
| 171,216 | DeForest | Dec. 21, 1875 |
| 1,226,835 | Wilder | May 22, 1917 |
| 1,280,307 | Rust | Oct. 1, 1918 |
| 1,388,745 | Morton | Aug. 23, 1921 |
| 1,566,479 | Horvath et al. | Dec. 22, 1925 |
| 1,600,237 | Marx | Sept. 21, 1926 |
| 2,598,954 | Wengel | June 3, 1952 |
| 2,646,639 | Toth | July 28, 1953 |